United States Patent [19]
Itoh

[11] Patent Number: 5,847,793
[45] Date of Patent: Dec. 8, 1998

[54] LIQUID CRYSTAL DISPLAY APPARATUS AND FABRICATION PROCESS THEREOF

[75] Inventor: Nobuyuki Itoh, Noda, Japan

[73] Assignees: Sharp Kabushiki Kaisha, Osaka, Japan; Secretary of State for Defense in Her Britannic Majesty's Government of the United Kingdom of Great Britain and Northern Ireland, Hants, United Kingdom

[21] Appl. No.: 744,171

[22] Filed: Nov. 5, 1996

[30] Foreign Application Priority Data

Nov. 6, 1995 [JP] Japan .................................... 7-287671

[51] Int. Cl.⁶ ...................... G02F 1/1333; G02F 1/1343
[52] U.S. Cl. .......................... 349/110; 349/148; 349/138
[58] Field of Search ..................... 349/110, 148, 349/138

[56] References Cited

U.S. PATENT DOCUMENTS

| | | | |
|---|---|---|---|
| 4,712,874 | 12/1987 | Sekimura et al. . | |
| 4,728,176 | 3/1988 | Tsuboyama et al. . | |
| 4,964,702 | 10/1990 | Sugimoto et al. | 349/110 |
| 5,223,962 | 6/1993 | Shioji et al. | 349/110 |
| 5,348,828 | 9/1994 | Murata et al. | 430/20 |
| 5,358,810 | 10/1994 | Yoshino | 349/110 |
| 5,633,739 | 5/1997 | Matsuyama et al. | 349/110 |

FOREIGN PATENT DOCUMENTS

| | | | |
|---|---|---|---|
| 32 35277 | 3/1984 | Germany | 349/110 |
| 3940640 | 12/1989 | Germany . | |
| 61-046931 | 7/1986 | Japan . | |
| 3223810 | 10/1991 | Japan . | |

OTHER PUBLICATIONS

"FLCD Showing High Contrast and High Luminance" (H. Rieger et al., SID 91 Digest, pp. 396–399).

"Submicrosecond Bistable Electra–Optic Switching in Liquid Crystals" (N.A. Clark et al, Appl. Phys. Lett: 36(11), 1 Jun. 1980, pp. 899–901).

Primary Examiner—William L. Sikes
Assistant Examiner—Toan Ton

[57] ABSTRACT

A liquid crystal display apparatus includes a first glass substrate with signal electrodes arranged in a striped pattern, a second glass substrate with scanning electrodes arranged in a striped pattern, and a ferroelectric liquid crystal between the first and second glass substrates, the first and second glass substrates facing each other and being fastened so that the signal and scanning electrodes cross each other at right angles. Light blocking members functioning as a black matrix are formed on the first glass substrate so that each light blocking member is placed between adjacent signal electrodes, forms a substantially flat surface with the signal electrodes and is partly buried in the first glass substrate. Metal lines are also buried in the first glass substrate so as to be in contact with the signal electrodes. A similar light blocking member is buried between adjacent scanning electrodes and similar metal lines are arranged on the second glass substrate. It is possible to provide for a liquid crystal display apparatus using ferroelectric liquid crystals a substrate structure which does not cause a difference in level on the substrate due to the black matrix. Moreover, the resistance of the signal and scanning electrodes is lowered by the metal lines.

13 Claims, 11 Drawing Sheets

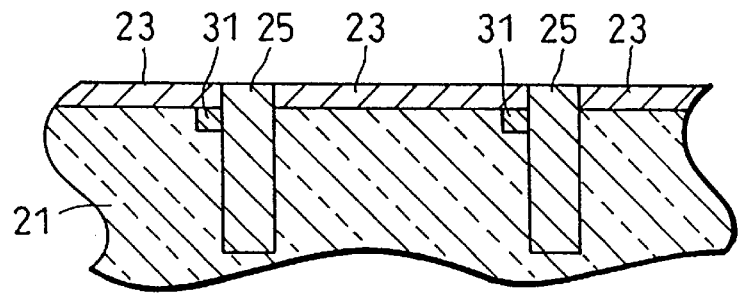
FIG. 3
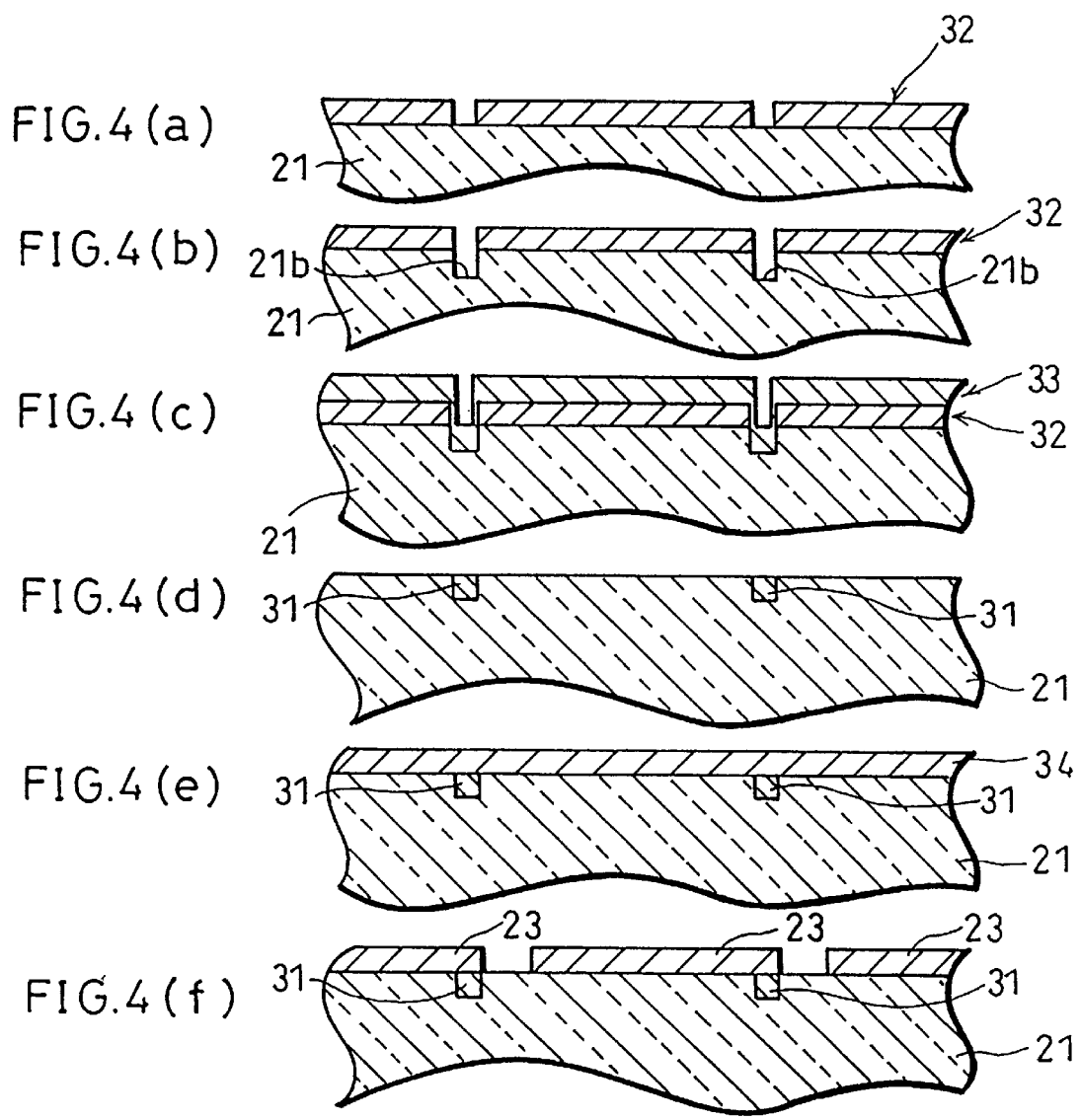
FIG. 4(a)
FIG. 4(b)
FIG. 4(c)
FIG. 4(d)
FIG. 4(e)
FIG. 4(f)

LIQUID CRYSTAL DISPLAY APPARATUS AND FABRICATION PROCESS THEREOF

FIELD OF THE INVENTION

The present invention relates to a high-definition, large-area matrix-type liquid crystal display device and a method for producing the same.

BACKGROUND OF THE INVENTION

A liquid crystal display device has extremely advantageous characteristics to flat display elements, such as thin, light weight, low power consumption, and low drive voltage. Therefore, the liquid crystal display device is an indispensable display for information equipment, including laptop personal computers, word processors, portable remote terminals, potable televisions, etc.

At present, liquid crystal display devices of STN (super-twisted nematic) type and TN (twisted nematic) type using TFT (thin film transistor) as a driving element are generally used. However, both types of the liquid crystal display devices use nematic liquid crystals, and must solve many problems in order to achieve display of higher definition and larger capacity.

The STN-type liquid crystal display device has a relatively simple structure in which two pieces of transparent substrates having transparent electrodes formed in a striped pattern thereon are positioned to face each other, and is driven by a so-called "simple matrix" drive scheme. Superior characteristics of the STN-type liquid crystal display device are easy production and low production cost. However, in theory, a further increase in the number of scanning lines is almost impossible because of the limitations in the response speed of liquid crystals, the light transmitting characteristic against an applied voltage, and other characteristics.

On the other hand, in an active matrix liquid crystal display device using TFT, a full color moving image equivalent to that produced by a cathode ray tube is obtained. However, in this liquid crystal display device, it is necessary to form a switching element (TFT) without causing pixel defects. Consequently, the production of the liquid crystal display device becomes complicated as the display capacity increases. In this structure, since the switching element is formed in the pixel, the liquid crystal display device has a problem, i.e., a lowering of the transmittance.

In resent years, in order to solve the above problems, liquid crystal display devices using ferroelectric liquid crystals have been the focus of attention. As taught by N. A. Clark and S. T. Lagerwall, Appl. Phys. Lett. 36, pp. 899–901 (1980), ferroelectric liquid crystals have excellent characteristics, including memory effect, high-speed response, and wide viewing angle. Thus, a simple matrix liquid crystal display device adapting ferroelectric liquid crystals are suitable for display of high-definition, large-capacity pixels.

For example, as illustrated in FIG. 7, a conventional liquid crystal display device using ferroelectric liquid crystals includes two pieces of glass substrates 51 and 52 positioned to face each other. On a surface of the glass substrate 51, a plurality of transparent signal electrodes 53 are formed parallel to each other, and a transparent insulating film 54 is formed thereon. On the other hand, a plurality of scanning electrodes 55 are formed parallel to each other on the glass substrate 52 so that the scanning electrodes 55 cross the signal electrodes 53 at right angles, and an insulating film 56 is formed to cover the scanning electrodes 55. Alignment films 57 and 58 that underwent a uniaxial aligning treatment, for example, a rubbing treatment, are formed on the insulating films 54 and 56, respectively.

A space formed between the glass substrates 51 and 52 that are fastened with a sealing agent 60 is filled with a liquid crystal (ferroelectric liquid crystal) 59. The glass substrates 51 and 52 are sandwiched between polarizing plates 61 and 62 that are positioned so that the polarization axes thereof cross each other at right angles. Moreover, spacers 63 are placed between the alignment films 57 and 58, if necessary.

As illustrated in FIG. 8, a ferroelectric liquid crystal molecule 71 has a spontaneous polarization 72 in a direction orthogonal to the molecular long axis direction. The molecule 71 receives a force proportional to the vector product of the spontaneous polarization 72 and an electric field produced by a drive voltage that is applied across the signal electrode 53 and the scanning electrode 55, and moves on the surface of a conical locus 73.

Therefore, it seems that the molecule 71 switches between positions $P_a$ and $P_b$ of the axes of a liquid crystal locus as shown in FIG. 9. For example, if the polarizing plates 61 and 62 are disposed so that their polarization axes coincide with the A–A' line and the B–B' line shown by the arrows in FIG. 9, respectively, a dark field is obtained when the molecule 71 is at the position $P_a$, and a bright field caused by double refraction is presented when the molecule 71 is at the position $P_b$.

Since the aligned states of the molecule 71 at the positions $P_a$ and $P_b$ are equivalent in elastic energy, these aligned states, i.e., optical states, are retained even after the removal of the electric field. This is called "a memory effect". The memory effect is a unique characteristic of ferroelectric liquid crystals and is not seen in nematic liquid crystals.

Consequently, in a simple matrix liquid crystal display device using ferroelectric liquid crystals having the memory effect and the high-speed response characteristic due to spontaneous polarization 72, display of higher definition and larger capacity is presented.

However, although the memory effect of ferroelectric liquid crystals is extremely effective, it suffers from the following drawback.

As illustrated in FIG. 10, in the liquid crystal display device, pixel regions 81 responsible for display are formed at the intersections of the signal electrodes 53 and the scanning electrodes 55 of the display panel. Sections other than the pixel regions 81 on the display panel form a non-display region 82 which is not involved in display.

The aligned states at the positions Pa and Pb are equivalently stable. Therefore, in the non-pixel region 82, the alignment of the liquid crystal molecules cannot be fixed to one of the positions because the drive voltage is not applied. Consequently, both a bright section 83 through which light is transmitted and a spotted dark section 84 which blocks light are present, causing a lowering of display contrast. On the other hand, such a problem does not occur in nematic liquid crystals which do not have the memory effect and are stable only in one kind of aligned state in the absence of an electric field.

In order to solve the above problem, for example, the following structure is adopted in a prior art.

In this structure, as shown in FIG. 11, a light blocking metal thin film 92 is formed on a transparent substrate 91, an insulating layer 93 is formed thereon, and ITO electrodes 94 are further formed thereon (see H. Rieger et al., SID 91

DIGEST, p.396). Such a structure for compulsorily shading the non-display area is called "a black matrix".

Since the metal has high light blocking properties, even if the thickness of the metal thin film 92 is as small as around 200 nm, the metal thin film 92 sufficiently functions as the black matrix. However, if the insulating layer 93 does not have satisfactory insulating properties, a leakage current occurs between the metal thin film 92 and the ITO electrodes 94. This may make the driving of the pixels infeasible.

As pointed out by Rieger et al., in order to prevent a displacement of the patterns of the metal thin film 92 and the ITO electrodes 94, it is necessary to render the width of the metal thin film 92 slightly greater than a space D between the ITO electrodes 94. However, if such a wide metal thin film 92 is formed, a difference in level is produced at both of the edges of the ITO electrode 94. It is known that such a difference in level also appears in the other layer covering the ITO electrodes 94, and causes vicious effects not only on the non-display region 82, but also on the alignment and switching characteristics of ferroelectric liquid crystals in the pixel regions 81.

In the structure shown in FIG. 12, an insulating black matrix 95 is formed between the ITO electrodes 94 on the transparent substrate 91. As the black matrix 95, an organic insulting material such as black pigment, or silicone may be used. The use of the insulating material solves the above-mentioned problems, i.e., a leakage current and displacement of patterns.

However, since the light blocking properties of the black matrix 95 are inferior to those of metal, it is necessary to make the thickness of the black matrix 95 greater than that of the metal thin film 92 in order to perform shading equivalent to shading achieved by the metal. Such an increase in the thickness of the black matrix 95 results in a larger difference in level.

Japanese Publication for Unexamined Patent Application (Tokukaihei) No. 3-223810 (1991) discloses a structure in which a black polymer is placed as a black matrix in a recessed section formed between transparent electrodes on a substrate surface. In this structure, since a thick black matrix is formed by placing the black polymer in the recessed section, it is possible to ensure sufficient light blocking properties of the black matrix.

In this structure, however, since the black matrix protrudes from the top surface of the transparent electrodes, the above-mentioned problem, i.e., a difference in level, occurs. In order to solve such a problem, in the above structure, an equivalent layer is arranged to cover the transparent electrodes and the black matrix. As a result, the influence of a difference in level is reduced, but the difference in level is not completely eliminated. Thus, this arrangement is not enough to thoroughly solve the problem.

In order to achieve a high-definition, large-capacity display, not only the characteristics of liquid crystals, but also the resistance of the ITO electrodes 94 are of importance. In a liquid crystal display device, as the display area and the number of pixels increase, the line length of each line of the ITO electrodes 94 becomes greater and the line width thereof becomes smaller. As a result, the resistance of the ITO electrodes 94 becomes higher, the waveform of a drive voltage to be applied to the liquid crystal becomes less sharp, and a voltage drop occurs in the ITO electrodes 94.

In order to solve these problems, conventional structures shown in FIGS. 13(a) and 13(b) were proposed. In the structure of FIG. 13(a), metal lines 96 are formed on the ITO electrodes 94. In the structure of FIG. 13(b), the metal lines 96 are formed on the transparent substrate 91, and covered with the ITO electrodes 94. In either of the structures, it is possible to lower the overall electrode resistance by providing the metal lines 96.

However, in these structures, a difference in level occurs since the metal lines 96 are provided.

SUMMARY OF THE INVENTION

It is an object of the present invention to provide a liquid crystal display device capable of ensuring a sufficiently flat electrode surface, sufficient shading for a non-display region and a lower electrode resistance than that in a conventional structure, and a method for producing such a liquid crystal display device.

In order to achieve the above object, a liquid crystal display device of the present invention includes:

- a liquid crystal layer formed by a ferroelectric liquid crystal;
- a plurality of transparent electrodes, arranged on both sides of the liquid crystal layer to intersect each other, for applying a voltage to the liquid crystal layer at intersections of the transparent electrodes;
- a pair of transparent supporting layers, positioned to face each other, for supporting the transparent electrodes;
- a plurality of light blocking members with insulating properties for blocking transmission of light through the liquid crystal layer, each of the light blocking members being arranged between adjacent transparent electrodes to form a flat surface with the transparent electrodes and being partly buried in the supporting layer; and
- conductors buried in the supporting layer so as to be in contact with the transparent electrodes.

In this structure, since the light blocking members form a flat surface with the transparent electrodes, there is no difference in level between the transparent electrodes and the light blocking members. Therefore, even if another layer is formed on the transparent electrodes, this layer is not affected by a difference in level. Moreover, since the light blocking members are partly buried in the supporting layer, it is possible to ensure a sufficient thickness and a high light blocking properties.

Further, since the conductors are in contact with the transparent electrodes, the resistance of the transparent electrodes is lowered, thereby achieving uniformity of display. In addition, when the conductors are buried in the light transmitting substrate, a difference in level does not appear on the transparent electrodes.

Accordingly, if the above-mentioned structure is adopted, it is possible to achieve uniformity of display and improve contrast.

In this liquid crystal display device, the conductors are preferably arranged to be in contact with the side edges of the transparent electrodes. In the case where the pixel is formed by the transparent electrode, this arrangement prevents light from being blocked by the conductors at the center of the pixel region. Thus, an excellent display can be presented by adopting the above structure.

In order to achieve the above object, a method for producing a liquid crystal display device of the present invention by forming a plurality of transparent electrodes on a pair of light transmitting substrates, positioning the light transmitting substrates to face each other so that the transparent electrodes intersect each other between the light transmitting substrates, and forming a liquid crystal layer by a ferroelectric liquid crystal between the light transmitting substrates, includes the steps of:

(1) forming a first recessed section on a surface of the light transmitting substrate on which the transparent electrodes are to be formed, before forming the transparent electrodes;

(2) filling the first recessed section with a conducting material to form a flat surface with the light transmitting substrate;

(3) forming a second recessed section in an exposed portion of the light transmitting substrate between adjacent transparent electrodes, after forming the transparent electrodes; and (4) filling a space between adjacent transparent electrodes and the second recessed section formed below the space with a light blocking insulating material to form a flat surface with the transparent electrodes.

In this method, in step (2), the first recessed section formed in step (1) is filled with the conducting material to form a flat surface with the light transmitting substrate. When the transparent electrodes are formed on the light transmitting substrate in this manner, the transparent electrodes are in contact with the conducting material. It is thus possible to lower the resistance of the transparent electrodes and achieve uniformity of display. Moreover, since the conducting material is buried in the light transmitting substrate, no difference in level appears on the transparent electrodes.

Further, in step (4), since the space between adjacent transparent electrodes and the second recessed section formed in step (3) are filled with an insulating material to form a flat surface with the transparent electrodes, there is no difference in level between the transparent electrodes and the light blocking members made of the insulating material. Consequently, even if another layer is formed on the transparent electrodes, this layer is not affected by a difference in level. Accordingly, a liquid crystal display device produced in accordance with the above-mentioned method presents uniformity of display and improved contrast.

In this method, it is preferred that the conducting material is placed on the light transmitting substrate and into the first recessed section to have a thickness equal to the depth of the first recessed section, and only the conducting material on the light transmitting substrate is removed in step (2). It is also preferred that the insulating material is placed on the transparent electrodes and into the second recessed section to have a thickness equal to the depth of the second recessed section, and only the insulating material on the transparent electrodes is removed in step (4).

In this case, the removal of the conducting material and the insulating material can be performed by a lift-off technique that is often used in the production of semiconductors. Consequently, the conducting material and the insulating material can be relatively easily fitted without using a special method. It is thus possible to simplify the processing steps of the above production method.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a cross sectional view showing the structure of an electrode substrate of the liquid crystal display device.

FIGS. 4(a) to 4(f) are process drawings showing the steps of forming metal films on the electrode substrate shown in FIG. 3.

DESCRIPTION OF THE PREFERRED EMBODIMENTS [Embodiment 1]

The following description will discuss one embodiment of the present invention with reference to FIGS. 1 to 5.

Figure 1:
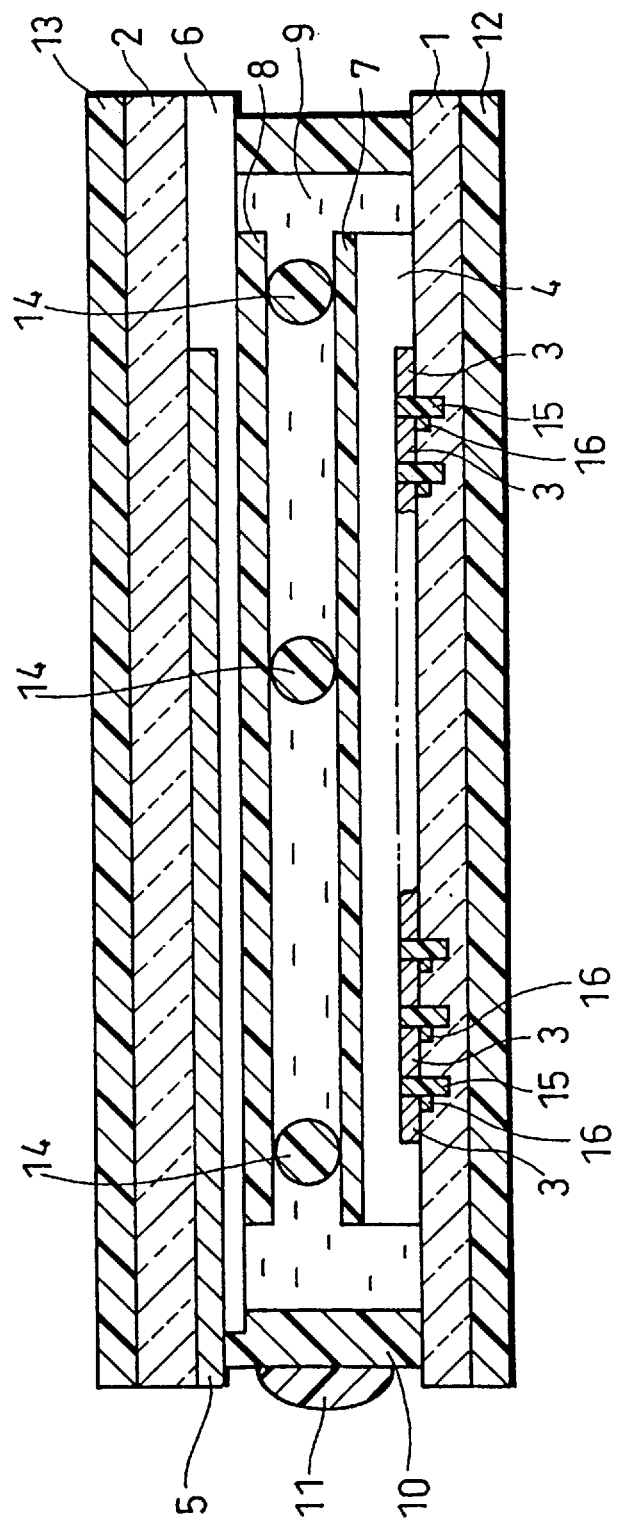
FIG. 1 is a cross sectional view showing the structure of essential sections of a liquid crystal display device according to one embodiment of the present invention.

As illustrated in FIG. 1, a liquid crystal display device of this embodiment includes two pieces of substrates 1 and 2 as light transmitting substrates (supporting layers) positioned to face each other.

On a surface of the glass substrate 1, a plurality of transparent signal electrodes 3 as transparent electrodes, made of, for example, indium tin oxide (generally called "ITO"), are arranged parallel to each other. Further, a transparent insulating film 4 made of, for example, silicon oxide ($SiO_2$) is layered thereon.

On the other hand, on a surface of the glass substrate 2, a plurality of transparent scanning electrodes 5 as transparent electrodes, made of, for example, ITO, are arranged parallel to each other so that the scanning electrodes 5 and the signal electrodes 3 cross each other at right angles. The scanning electrodes 5 are covered with a transparent insulating film 6 made of, for example, $SiO_2$.

Formed on the insulating films 4 and 6 are alignment films 7 and 8, respectively, that underwent a uniaxial aligning treatment such as a rubbing treatment. Examples of the alignment films 7 and 8 are a film made of organic polymer such as polyimide, nylon and polyvinyl alcohol, and a film of $SiO_2$ formed by oblique evaporation. When organic polymer films are used as the alignment films 7 and 8, an aligning treatment is generally applied so that liquid crystal molecules are aligned substantially parallel to the electrode substrates (the glass substrates 1 and 2 having the transparent electrodes formed thereon).

The glass substrates 1 and 2 are positioned to face each other and fastened with a sealing agent 10. A space between the fastened substrates 1 and 2 is filled with a ferroelectric liquid crystal 9 that forms a liquid crystal layer. The ferroelectric liquid crystal 9 is injected through an inlet (not shown) provided in the sealing agent 10, and sealed in the space by closing the inlet with a closing agent 11.

The glass substrates 1 and 2 are sandwiched between two pieces of polarizing plates 12 and 13 which are positioned so that the polarization axes thereof cross each other at right angles. When the display area is wide, spacers 14 are provided between the alignment films 7 and 8 so as to achieve a uniform cell gap.

A square region formed by the facing signal electrodes 3 and the scanning electrodes 5 produces a pixel region (not shown). When a voltage is applied to the signal electrode 3 and the scanning electrode 5, the aligned state of the molecules of the ferroelectric liquid crystal 9 switches. A display is presented by a change in the display state between bright and dark caused by a switching of the aligned state of the molecules of the ferroelectric liquid crystal 9.

Moreover, a light blocking member 15 is partly buried in the glass substrate 1 between adjacent signal electrodes 3 to form a substantially flat surface with the signal electrodes 3. The light blocking members 15 are provided to block light passing through a region other than the pixel regions, i.e., a non-display region, and function as a black matrix.

Additionally, metal lines 16 as conductors are buried in the glass substrate 1 so that the metal lines 16 are in contact with the rear surface (a side facing the glass substrate 1) of the signal electrodes 3 and adjoin the light blocking members 15.

Similarly, although not shown in FIG. 1, in the glass substrates 2, a light blocking member like the light blocking member 15 is buried between adjacent scanning electrodes 5, and metal lines like the metal lines 16 are buried.

Next, the following description will explain the fabrication of the electrode substrate in the process of producing the liquid crystal display device.

First, as illustrated in FIG. 2(a), ITO is deposited in a thickness of 200 nm on substrates 21 (glass substrates 1 and 2) by evaporation. After applying a photoresist 22 thereto, the ITO is patterned in a striped pattern to form transparent electrodes 23 (signal electrodes 3 and scanning electrodes 5) with a width of 200 $\mu$m. As the glass substrate 1, "Glass Substrate 7059" available from Corning Inc. is used. The patterning of ITO is carried out by photolithography using a photographic mask and an ultraviolet-ray exposure device, and by performing etching with an etching agent containing 47% oxalic acid (HBr) at 35° C. for seven minutes.

Subsequently, as illustrated in FIG. 2(b), the substrate 21 is etched to a depth of 1 $\mu$m with an etching agent containing 15% ammonium hydrogen difluoride ($NH_4HF_2$) at 25° C. for 13 minutes. The etching conditions including the kind of the etching agent, the etching time, etc., vary depending on the type of glass substrates used. By performing the above-mentioned etching, recessed sections 21a (second recessed sections) are formed between the transparent electrodes 23 on the substrate 21.

Thereafter, as shown in FIG. 2(c), silicon 24 is deposited in a thickness of 1 $\mu$m that is equal to the depth of the recessed sections 21a by evaporation. Consequently, the silicon 24 is placed upon the transparent electrodes 23 and in the recessed sections 21a.

Further, by lifting off the photoresist 22, a black matrix 25 (light blocking members 15) is formed as shown in FIG. 2(d) The black matrix 25 forms a substantially flat surface with the transparent electrodes 23. The difference in level between the actual black matrix 25 and the transparent electrodes 23 was measured to around ±5 nm by a measure. It was known that such a difference in level is much smaller than that in a conventional structure. Moreover, it was found that the non-display region is perfectly shaded by the black matrix 25.

With the use of the above electrode substrate (substrate 21 whereupon the transparent electrodes 23 are formed), a display device of three inches long in a diagonal direction and a display device of ten inches long in a diagonal direction were actually produced. During the production, the insulating films 4 and 6 were formed by sputtering $SiO_2$ onto the glass substrates 1 and 2, and the alignment films 7 and 8 were formed thereon by "PSI-A-2001" available from Chisso Co., Ltd. Then, a uniaxial aligning treatment such as a rubbing treatment was applied to the alignment films 7 and 8. Next, the glass substrates 1 and 2 were fastened, and the ferroelectric liquid crystal 9 ("SCE8" available from Merck Ltd.) was sealed in the space between the fastened substrates 1 and 2. The line resistance of the display devices, indicated by a sheet resistance, was 15 $\Omega$.

In either of the display devices produced in the above mentioned manner, a C2U alignment effective for a ferroelectric liquid crystal display device was uniformly obtained over the entire display area without any defects. Moreover, when the polarizing plates 12 and 13 were provided to cause the stable state of alignment to be a dark state, the entire display area including the non-display region showed a uniform dark state.

Furthermore, in the display device with a diagonal line of three inches, since the non-display region was perfectly shaded by the black matrix (light blocking members), a uniform, high-contrast display was achieved. On the other hand, in the display device with a diagonal line of ten inches, the non-display region was perfectly shaded by the black matrix, but a displayable section and a non-displayable section were produced because of a voltage drop in the transparent electrodes 23. Consequently, a uniform, high-contrast display was not achieved.

In order to restrain the voltage drop, the present liquid crystal display device includes a metal film 31 (metal lines 16) as shown in FIG. 3. The method for fabricating the metal film 31 will be explained below.

First, as illustrated in FIG. 4(a), a striped photoresist pattern 32 is formed on the substrate 21 (7059 Glass Substrate) using photolithography. Subsequently, as shown in FIG. 4(b), the substrate 21 is etched to a depth of 400 nm using an etching agent containing 15% ammonium hydrogen difluoride at 25° C. for 6 minutes. As a result, recessed sections 21b as first recessed sections are formed.

Thereafter, as shown in FIG. 4(c), copper (Cu) 33 as a conducting material is deposited in a thickness of 400 nm by evaporation. By lifting off the photoresist pattern 32, the metal film 31 is formed in a striped pattern as shown in FIG. 4(d). Then, as illustrated in FIG. 4(e), ITO 34 is deposited in a thickness of 200 nm on the substrate 21 having the metal film 31 by evaporation so as to form the transparent electrodes 23 as shown in FIG. 4(f) by the same process shown in FIG. 2. Although the photoresist remains on the transparent electrodes 23 after patterning the ITO 34, the remaining photoresist is omitted in FIG. 4(f) for the sake of convenience.

Figure 2:
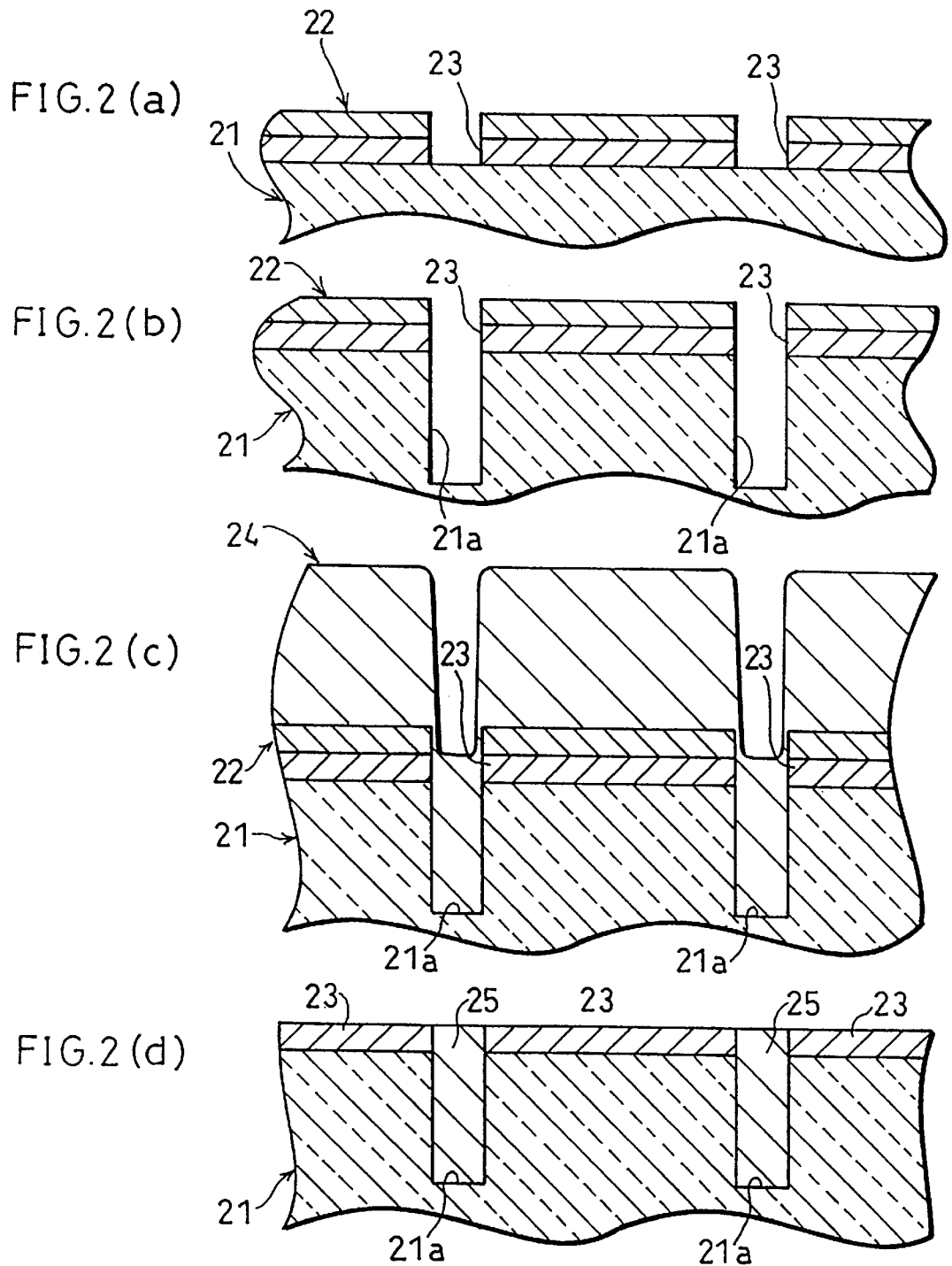
FIGS. 2(a) to 2(d) are process drawings showing the steps of forming electrodes and light blocking members on a substrate of the liquid crystal display device shown in FIG. 1.

Thereafter, the substrate 21 was etched in the manner shown in FIG. 2, silicon is deposited on the substrate 21, and the photoresist is lifted off to form the black matrix 25 as shown in FIG. 3. As a result, the electrode substrate is obtained.

In the electrode substrate fabricated in the above-mentioned manner, since the metal film 31 is buried (filled) in the substrate 21 so that the metal film 31 comes into contact with the transparent electrodes 23, the metal film 31 and the transparent electrodes 23 form a flat surface.

Moreover, since the black matrix 25 and the metal film 31 are adjacent to each other, light is not blocked by the metal film 31 at the center of the pixel regions formed in the intersections of the transparent electrodes 23 between the facing substrates 21. It is thus possible to present an excellent display.

With the use of the above electrode substrate, a display device with a diagonal line of three inches and a display device with a diagonal line of ten inches were produced like the above. The line resistance of the display devices, indicated by a sheet resistance, was 1 Ω.

In either of the display devices, the C2U alignment effective for a ferroelectric liquid crystal display device was uniformly obtained over the entire display area without any defects. Moreover, when the polarizing plates 12 and 13 were provided to cause the stable state of alignment to be a dark state, the entire display area including the non-display region showed a uniform dark state.

In the display device with a diagonal line of three inches, since the non-display region was perfectly shaded by the black matrix (light blocking members), a uniform, high-contrast display was achieved. Similarly, a uniform, high-contrast display was achieved by the display device with a diagonal line of ten inches.

Figure 5:
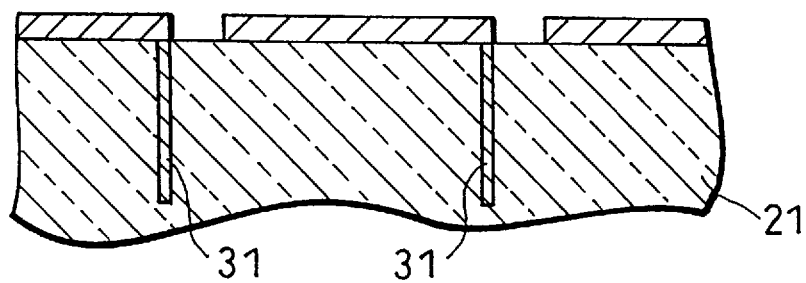
FIGS. 5(a) and 5(b) are process drawings showing the steps of fabricating an electrode substrate different from the electrode substrate shown in FIG. 3.
Figure 5:
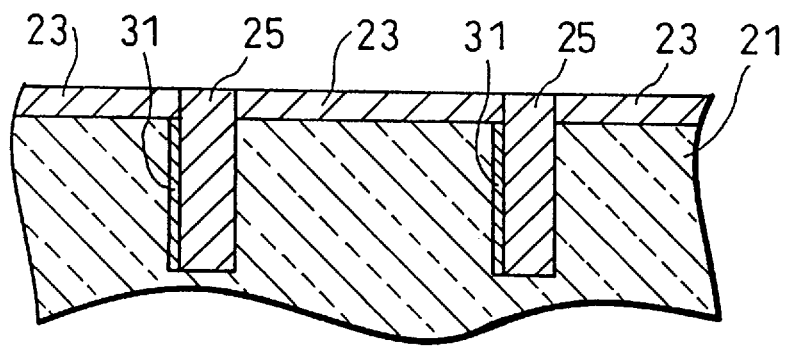

In this embodiment, the thickness of the metal film 31 is arranged to be 400 nm. However, a necessary electrode resistance can be obtained using the metal film 31 with a smaller width by increasing the etched depth of the substrate 21 and the thickness of the deposited metal as shown in FIG. 5(a). In addition, in the state where the light blocking members 15 were formed as shown in FIG. 5 (b), it was possible to lower the electrode resistance without reducing the effective display area (aperture ratio) of the transparent electrodes 23.

In this embodiment, the copper 33 is used as a material for the metal film 31. However, it is also possible to use other metal materials of low resistance, such as silver (Ag), gold (Au), and aluminum (Al).

[Embodiment 2]

Figure 6:
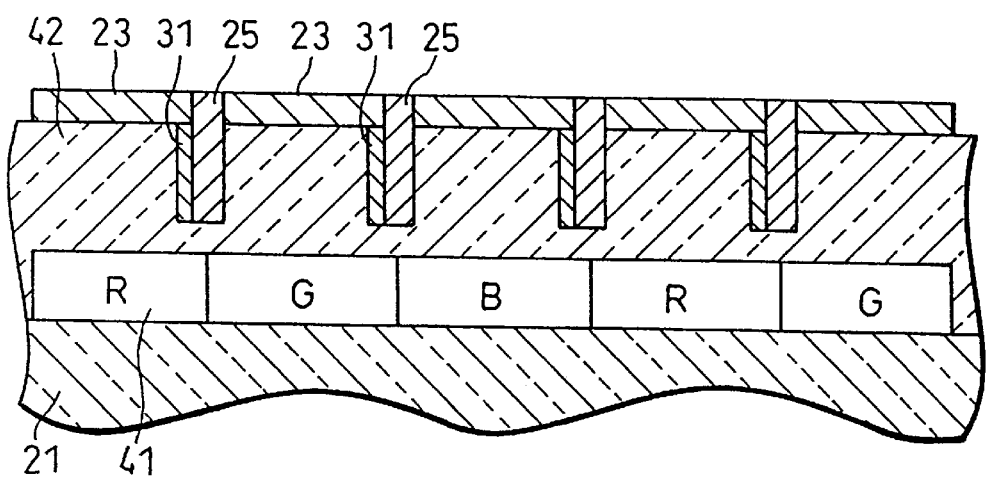
FIGS. 6(a) and 6(b) are cross sectional views showing the structures of two kinds of electrode substrates of a liquid crystal display device according to another embodiment of the present invention.
Figure 6:
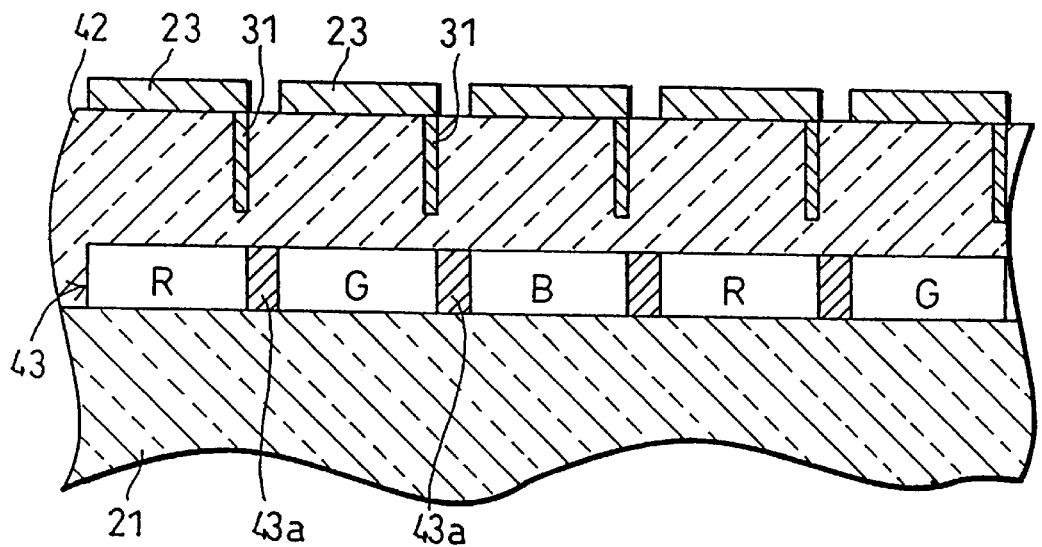
Figure 7:
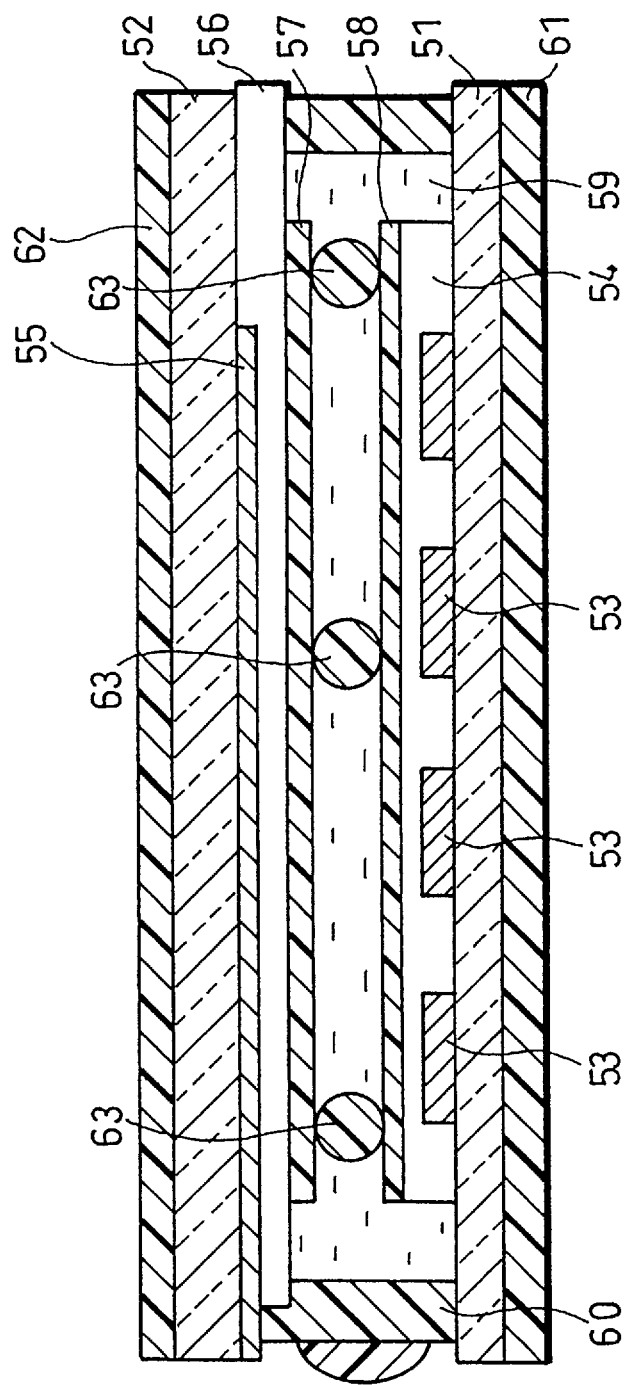
FIG. 7 is a cross sectional view showing the structure of essential sections of a conventional liquid crystal display device.
Figure 8:
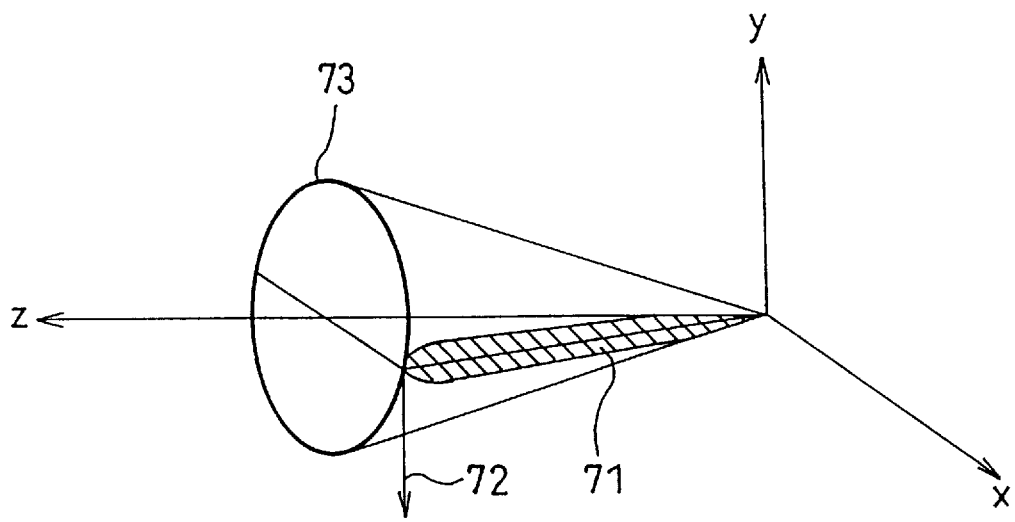
FIG. 8 is a view for explaining the response of ferroelectric liquid crystal molecules to an electric field.
Figure 9:
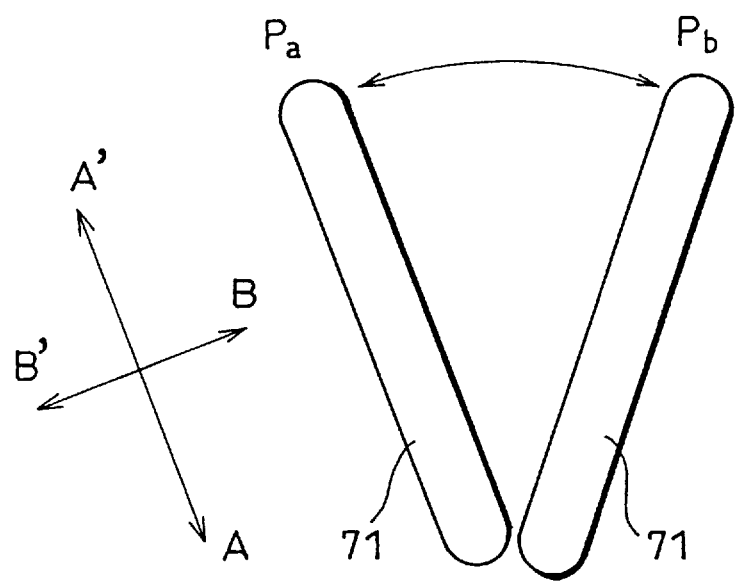
FIG. 9 is a view for showing a state in which the ferroelectric liquid crystal molecule switches between bistable states.
Figure 10:
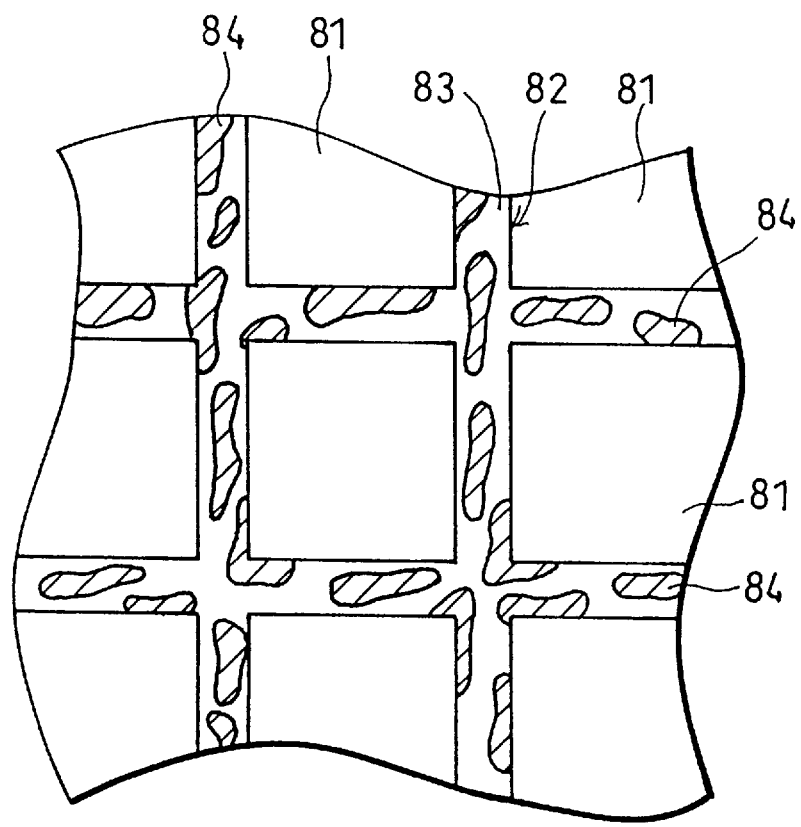
FIG. 10 is a view showing non-uniformity of the display state in a non-display region of a conventional liquid crystal display device.
Figure 11:
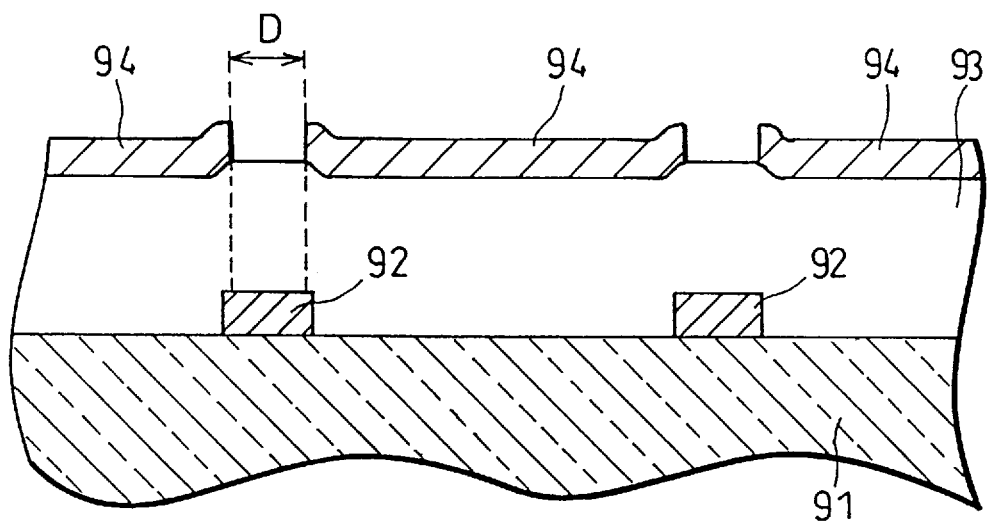
FIG. 11 is a cross sectional view showing the structure of an electrode substrate of a conventional liquid crystal display device having a black matrix formed by a metal.
Figure 12:
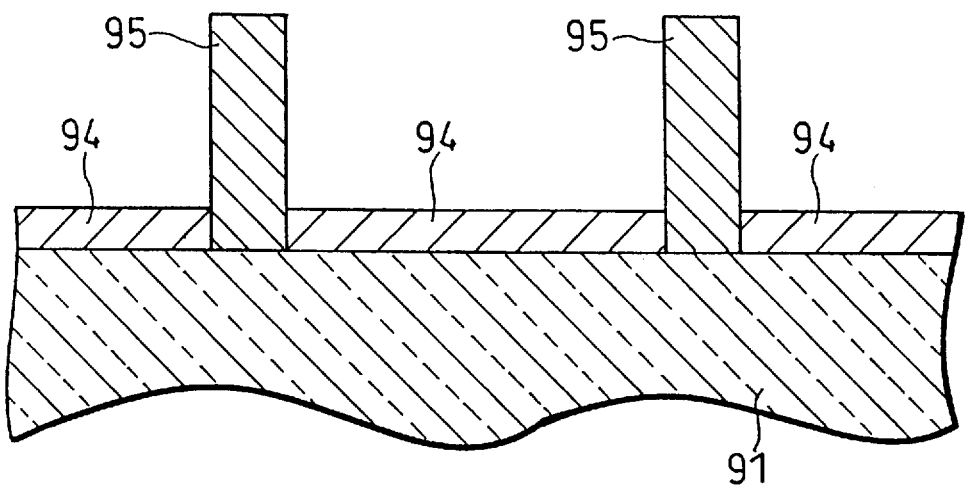
FIG. 12 is a cross sectional view showing the structure of an electrode substrate of a conventional liquid crystal display device having a black matrix formed by an insulating material.
Figure 13A:
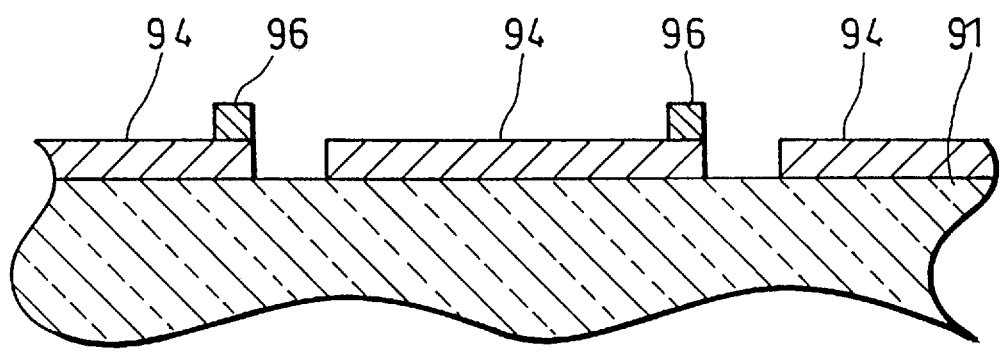
FIGS. 13(a) and 13(b) are cross sectional views showing the structures of two kinds of electrode substrates of a conventional liquid crystal display device having metal lines that are provided for lowering the resistance of transparent electrodes.
Figure 13B:
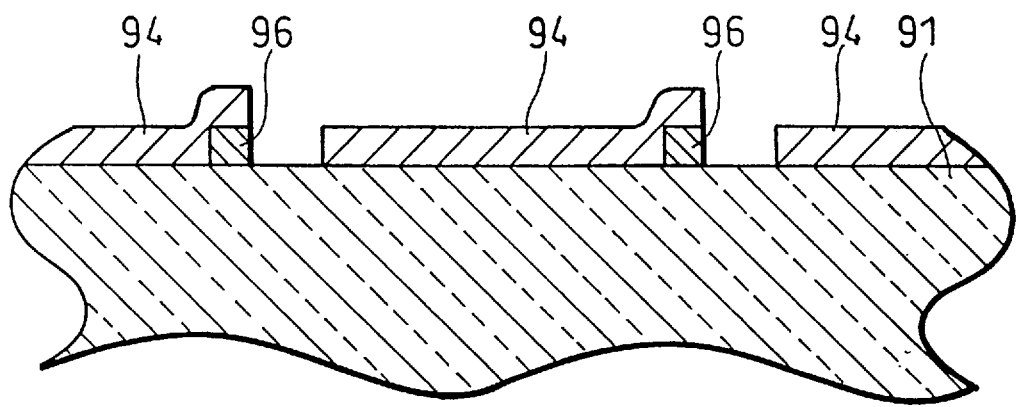

The following description will discuss another embodiment of the present invention with reference to FIGS. 6(a) and 6(b). The component elements having the same function as in Embodiment 1 will be designated by the same code and their description will be omitted.

As illustrated in FIG. 6(a), in a liquid crystal display device of this embodiment, a color filter 41 is provided on the substrate 21 (either of the substrates 1 and 2). The color filter 41 is separated into sections for transmitting red (R), green (G), and blue (B) lights, respectively. These sections correspond to the transparent electrodes 23, respectively. Further, formed on the color filter 41 is an overcoat film 42 as a supporting layer made of an acrylic resin which is generally used for a substrate having a color filter. On the overcoat film 42, the transparent electrodes 23, the black matrix 25, and the metal film 31 are formed in the same manner as in Embodiment 1.

Alternatively, in another liquid crystal display device of this embodiment, as illustrated in FIG. 6(b), the overcoat film 42 is formed on a color filter 43 having a black matrix 43a thereon. The transparent electrodes 23 and the metal film 31 are formed on the overcoat film 42.

In this structure, since the black matrix is not formed between adjacent transparent electrodes 23, a difference in level is caused by the thickness of the transparent electrodes 23. However, since the transparent electrodes 23 are extremely thin, the above-mentioned difference in level does not cause vicious effects on the alignment and switching characteristics of the ferroelectric liquid crystal 9.

In the structure including the color filters 41 and 43, one pixel is formed by three lines of transparent electrodes 23 corresponding to R, G, B sections of the color filters 41 and 43 and one line of transparent electrode 23 that faces and crosses the above three lines of the transparent electrodes 23.

With the use of two kinds of electrode substrates having the above-mentioned structures, a display device with a diagonal line of three inches and a display device with a diagonal line of ten inches were produced like Embodiment 1. In either of the display devices, the C2U alignment effective for a ferroelectric liquid crystal display device was uniformly obtained over the entire display area without any defects. In this case, since the resistance of the transparent electrodes 23 is lowered by the metal film 31, non-uniformity of the display was not caused by a voltage drop. Additionally, since the non-display region was perfectly shaded by the black matrix 25 and 43a, a uniform, high-contrast color display was achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display apparatus comprising:

a liquid crystal layer formed by a ferroelectric liquid crystal;

a plurality of transparent electrodes, arranged on both sides of said liquid crystal layer to intersect each other, for applying a voltage to said liquid crystal layer at intersections of said transparent electrodes;

a pair of transparent supporting layers, positioned to face each other, for supporting said transparent electrodes;

a plurality of light blocking members with insulating properties for blocking transmission of light through said liquid crystal layer, each of said light blocking members being arranged between adjacent transparent electrodes so that top surfaces of said light blocking members are positioned at the same level as a level of surfaces of said transparent electrodes or at a lower level than that, and each of said light blocking members has a width approximately equal to a gap between adjacent transparent electrodes; and conductors buried in said supporting layers to be in contact with said transparent electrodes.

2. The liquid crystal display apparatus according to claim 1, wherein said light blocking members form a flat surface with said transparent electrodes and are partly buried in said supporting layer.

3. The liquid crystal display apparatus according to claim 2, wherein said supporting layers are light transmitting substrates.

4. The liquid crystal display apparatus according to claim 3, wherein said conductors are arranged to be in contact with side edges of said transparent electrodes.

5. The liquid crystal display apparatus according to claim 4, wherein a thickness of said conductors is greater than a width thereof.

6. The liquid crystal display apparatus according to claim 2, further comprising a color filter for color display, wherein one of said supporting layers is an overcoat film for coating said color filter, and the other supporting layer is a light transmitting substrate.

7. The liquid crystal display apparatus according to claim 6, wherein said conductors are arranged to be in contact with side edges of said transparent electrodes.

8. The liquid crystal display apparatus according to claim 7, wherein a thickness of said conductors is greater than a width thereof.

9. The liquid crystal display apparatus according to claim 1, further comprising:

color filters for color display, wherein one of said supporting layers is an overcoat film for coating said color filters, and the other supporting layer is a light transmitting substrate; and said light blocking members are arranged between said color filters, and on said light transmitting substrate so that said light blocking members form a flat surface with said transparent electrodes and are partly buried in said light transmitting substrate.

10. The liquid crystal display apparatus according to claim 9, wherein said conductors are arranged to be in contact with side edges of said transparent electrodes.

11. The liquid crystal display apparatus according to claim 10, wherein a thickness of said conductors is greater than a width thereof.

12. A process for fabricating a liquid crystal display apparatus by forming a plurality of transparent electrodes on a pair of light transmitting substrates, positioning said light transmitting substrates to face each other so that said transparent electrodes intersect each other between said light transmitting substrates, and forming a liquid crystal layer by a ferroelectric liquid crystal between said light transmitting substrates, comprising the steps of:

(1) forming a first recessed section on a surface of said light transmitting substrate on which said transparent electrodes are to be formed, before forming said transparent electrodes;

(2) filling said first recessed section with a conducting material to form a flat surface with said light transmitting substrate;

(3) forming a second recessed section in an exposed portion of said light transmitting substrate between adjacent transparent electrodes, after forming said transparent electrodes; and (4) filling a space between adjacent transparent electrodes and said second recessed section formed below said space with a light blocking insulating material so as to form a flat surface with said transparent electrodes.

13. The process for fabricating a liquid crystal display apparatus according to claim 12, wherein, in step (2), said conducting material with a thickness equal to a depth of said first recessed section is placed on said light transmitting substrate and in said first recessed section, and then only said conducting material on said light transmitting substrate is removed, and in step (4), said insulating material with a thickness equal to a depth of said second recessed section is placed on said transparent electrodes and in said second recessed section, and then only said insulating material on said transparent electrodes is removed.

* * * * *